UNITED STATES PATENT OFFICE.

JAMES HOWARD YOUNG, OF PITTSBURGH, PENNSYLVANIA, ASSIGNOR TO ASPROMET COMPANY, OF PITTSBURGH, PENNSYLVANIA, A CORPORATION OF PENNSYLVANIA.

COATING MATERIAL.

1,327,933.  Specification of Letters Patent.  Patented Jan. 13, 1920.

No Drawing.   Application filed September 11, 1918.  Serial No. 253,513.

*To all whom it may concern:*

Be it known that I, JAMES HOWARD YOUNG, a citizen of the United States, residing in Pittsburgh, in the county of Allegheny and State of Pennsylvania, have invented an Improvement in Coating Materials, of which the following description is a specification.

This invention relates to a coating material which is soluble in water and capable of forming a body which can be readily applied to any surface to form a firm, non-sticky and elastic layer or coating therefor. The coating material among other uses is especially adapted to be employed as a covering surface for materials which are more or less sticky and especially so under the influence of heat and pressure.

It is particularly adapted for use as a surface coating for asphaltic or other products of a sticky nature, which have heretofore been more or less handicapped by the fact that such products when shipped or stored will stick together more or less unless measures are taken to prevent it. The method now commonly employed to prevent such products from sticking together has been to coat them with dry powder or flaky materials, such as chalk, soapstone, flint, silica and the like, but the use of such materials is more or less unsatisfactory as they modify the physical appearance of the products, which limits their use and also are not always effective for preventing the sticking together of said products.

The present invention has for its object to provide a coating material which is soluble in water and can be used on asphaltic and other products to provide the same with a firm non-sticky exterior surface without detriment to such products or injuriously affecting the appearance of the same. The coating material may have incorporated with it a coloring matter or dye which may be of any desired color, and said coating material being soluble in water may be applied to the sticky surface by a brush or rolls, may be sprayed thereon or the products may be dipped therein. The coloring matter added to the coating material may be a soluble dye or it may be a pigment.

In accordance with this invention a coating material possessing the above noted desirable properties may be made by combining or incorporating with a substance or material which is soluble in water and normally has a relatively high surface tension when applied alone to the surface to be coated, a substance or material which has a relatively lower surface tension, which modifies the material having the relatively high surface tension to such extent that the mixture or coating will spread evenly over the surface to which it is applied and when dried will form a firm, non-sticky and elastic layer or film, which covers the surface uniformly and evenly and does not draw up or gather into small globules as does the material having the relatively high surface tension when applied alone to the surface to be coated.

A material which is soluble in water and normally possesses a relatively high surface tension, and which may be used as the base of my improved coating material is a form of cellulose known as viscose or a modification thereof known as viscoid, and a material having a relatively low surface tension and which can be admixed with viscose or viscoid, to lower the surface tension thereof and produce a non-sticky coating, is a soap solution or any compounds which produce soap or are soapy in nature, or in lieu thereof any other material which is capable of lowering the surface tension of the material having a relative high surface tension, may be employed with the latter.

In order that my invention may be clearly comprehended I will enumerate the steps employed in the production of the improved coating solution, when viscose or viscoid is not available as such but has to be prepared.

To this end, cellulose is first treated with sodium hydroxid to produce soda cellulose. An excess of the hydroxid may be used but it is preferred to employ an amount just sufficient for the reaction, and I have obtained good results with the following proportions, to wit, 25 to 35 parts air dry cellulose; 12.5 to 16 parts caustic soda; and 52 to 55 parts water.

The cellulose is treated with the sodium hydroxid solution by slowly adding the solution while the cellulose is being agitated, which agitation should be such that the sodium hydroxid is thoroughly incorporated with the cellulose. The reaction is completed within from 1 to 3 hours and is indicated by the appearance of the mass, which appears as crumbled bread when the reaction is complete. The soda cellulose should be protected from the air and if stored should be kept cool.

When an excess of the sodium hydroxid is used, it should be one of from 10 to 20% strength, and when used the excess alkali may be subsequently recovered. The soda cellulose produced is then treated with carbon bisulfid, 40 parts of carbon bisulfid being used to every 100 parts of cellulose present in the soda cellulose.

The reaction takes place at ordinary temperatures and should proceed out of contact with the air and takes from 1 to 3 hours. When the reaction is complete, the mass contains no fibers unacted upon, and such mass forms what is known as viscose or cellulose thiocarbonate which dissolves very slowly, forming a viscous or colloidal solution, which constitutes the base of my improved coating material.

Because viscose dissolves very slowly, it is desirable to have a strong stirring device in the apparatus in which the solution is made, and to add water slowly and in small portions at a time, allowing each portion to become incorporated before another is added. When a viscose solution is spread upon a smooth non-sticky surface and allowed to decompose, preferably by heating, the cellulose is regenerated as a thin film which is colored yellow, due to the products of decomposition formed. By washing with water, the products of decomposition are removed as they are soluble, leaving the cellulose as a transparent film, which is dry, not sticky and elastic.

If such a film would be formed on a sticky surface, the latter would be rendered non-sticky, but when a solution of viscose is applied to a sticky surface, such as asphalt, it will not completely or evenly cover the same but will draw up or gather into small globules and thereby leave portions of the sticky surface uncovered, which is due to the fact that the viscose solution has a high surface tension and does not wet the surface of the asphalt.

As long as no film or layer of viscose will form on sticky surfaces, such as asphalt, it is impossible to secure a film of "cellulose" since the regenerated cellulose assumes the physical form of the solution from which it is regenerated. Therefore, to render the viscose available as a coating for sticky surfaces, and especially surfaces of a sticky nature, such as an asphalt or other bituminous surface, or an oily or waxy surface, I incorporate or mix with the viscose a material or substance having a relatively low surface tension, such as a soap solution, which may be made by adding soap chips to hot water and stirring, said soap solution being allowed to cool before being mixed with the viscose.

The percentage of soap added to the viscose depends upon the nature of the surface to be coated, how the coat is applied, the viscosity of the coating and the temperature, and good results have been obtained between the limits of 0.1 per cent. and 5 per cent. of the whole, although it is not desired to limit the invention to these proportions.

The percentage of viscose which should be present in the coating medium depends upon the thickness of the layer or film required or desired, the method of putting the coating medium on the surfaces, and the nature of the latter. In general the percentage of viscose in the coating medium should preferably be about 3 per cent., but may vary between 1 and 10 per cent., but it is not desired to limit the invention to the proportions specified. If desired the coating may be colored to match the color of the surface to be coated, and the coloring matter may be added to the soap solution or to the mixture of soap and viscose.

The coating medium is capable of modification without departing from the invention. For instance, viscose containing impurities such as the excess alkali, carbon bisulfid and products of decomposition, may be used and mixed with the soap solution and the mixture used as the coating, which has the advantage of being cheaper than when the impurities are removed. If viscose is allowed to stand at ordinary temperatures, it changes in time to what is known as viscoid, which may be used with the soap solution to form a modified coating which is purer than the ordinary viscose and soap coating as it contains but small amounts of impurities. Viscoid may be chemically made from viscose solutions by adding thereto salts, such as sodium chlorid, or sodium bicarbonate which precipitate the viscoid from the viscose solution, and the viscoid thus made is washed free from impurities and dissolved in water again, to which latter sodium hydroxid may be added to hasten the solution. Instead of treating cellulose with sodium hydroxid, its equivalent alkali hydroxid may be used.

A coating medium such as above described, when applied to an asphalt surface, as for instance to metal articles protected by asbestos paper or felt covered with asphalt or the like, provides the latter, which is more or less sticky under heat and pressure, with an exterior coating, layer or film which is firm, non-sticky and elastic and which does not detract from the appearance and value of the protected metal article and enables the latter to be packed together and shipped without sticking together, and while the non-sticky coating is especially useful for this purpose, it is not desired to limit the invention in this respect, as the coating may be used to advantage on painted or varnished surfaces as well as on oily and waxy surfaces.

I claim—

1. A coating material comprising a base soluble in water and normally having a relatively high surface tension, and a material admixed therewith and capable of lowering the surface tension of said base, said material being soluble in water and present in the mixture in sufficient quantity to coöperate with the said base to reduce the surface tension of the latter and form therewith a coating which is capable of spreading evenly over a sticky surface and of forming a non-sticky layer which adheres firmly to the sticky surface.

2. A coating material comprising a cellulose base soluble in water and normally having a relatively high surface tension, and a non-sticky material admixed therewith and which coöperates with said cellulose base to lower the surface tension thereof, and which is present in sufficient quantity to form a coating material composed of a mixture of said materials which is soluble in water and capable of spreading evenly over a sticky surface and of forming thereon a non-sticky layer which firmly adheres thereto.

3. A coating material comprising a cellulose base soluble in water and normally having a relatively high surface tension, and a soluble material of a soapy nature incorporated with said base in sufficient quantity to reduce the surface tension thereof and form a mixture which is capable of spreading evenly over and firmly adhering to a sticky surface and form a non-sticky external surface for said sticky surface.

4. A coating material comprising viscose and a soluble soapy material incorporated therewith in sufficient volume to form a mixture of relatively lower surface tension than the viscose itself, and which is capable of spreading evenly over and firmly adhering to a sticky surface.

5. A coating material comprising viscose and a soluble material capable of lowering the surface tension of the latter and present in sufficient quantity to form with the viscose a mixture of relatively low surface tension and capable of being applied to a sticky surface to form a non-sticky external surface therefor which adheres firmly thereto.

In testimony whereof, I have signed my name to this specification.

JAMES HOWARD YOUNG.